Oct. 8, 1957         P. S. BALDWIN        2,808,703
MASTER CYLINDER FOR HYDRAULIC BRAKE SYSTEMS
Filed Oct. 20, 1952                    2 Sheets-Sheet 1
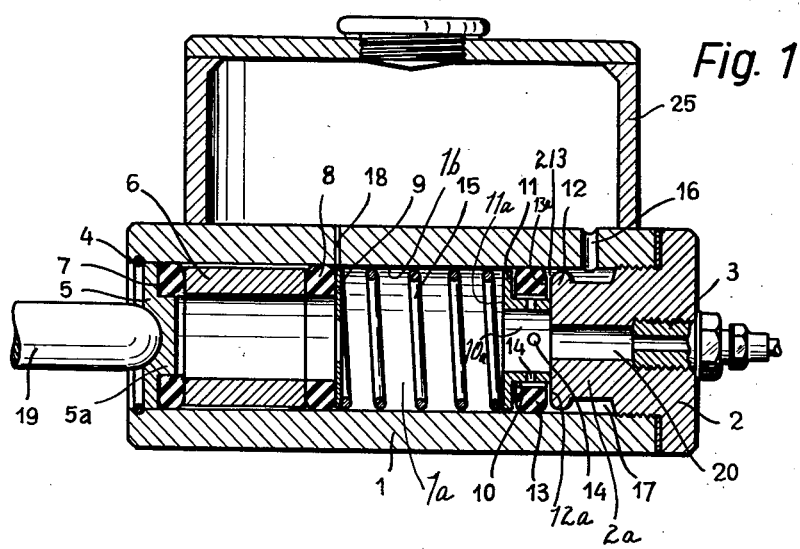
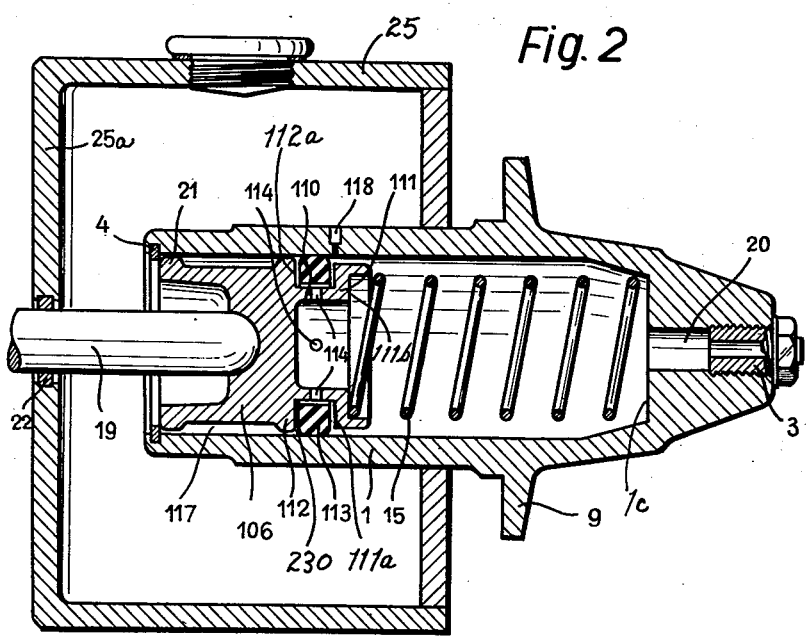
Inventor:
Philip S. Baldwin,
Attorney

United States Patent Office 2,808,703
Patented Oct. 8, 1957

2,808,703

MASTER CYLINDER FOR HYDRAULIC BRAKE SYSTEMS

Philip S. Baldwin, Florence, Italy, assignor of one-half to Fiat Società per Azioni, Turin, Italy Application October 20, 1952, Serial No. 315,675

Claims priority, application Italy October 31, 1951

6 Claims. (Cl. 60—54.6)

The invention relates to master cylinders for hydraulic brakes, more particularly for motor vehicles.

A first object of the invention is to provide a master cylinder for hydraulic brakes, wherein the compression chamber of the cylinder is promptly filled with fluid on the return stroke of the piston, thereby rendering easier the return of the piston to its initial rest position.

A further object of the invention is to provide means controlling communication between the compression chamber of the cylinder and the reservoir tank and insuring an uninterrupted communication between them on the return stroke of the piston and intercepting said communication on the protractile stroke of the piston.

A still further object of the invention is to provide a master cylinder for hydraulic brake systems, wherein the said control means are simple in construction and operation, readily fabricated and assembled, and economical to manufacture.

A still further object of the invention is to provide a master cylinder for hydraulic brakes of a simple construction and formed with an extremely reduced number of parts.

These and further objects of the invention will appear from the following description and accompanying drawings, wherein:

Fig. 1 is a longitudinal sectional view of a master cylinder constructed according to the present invention.

Fig. 2 is a longitudinal sectional view showing a modified form of a master cylinder constructed according to the present invention.

Figure 3:
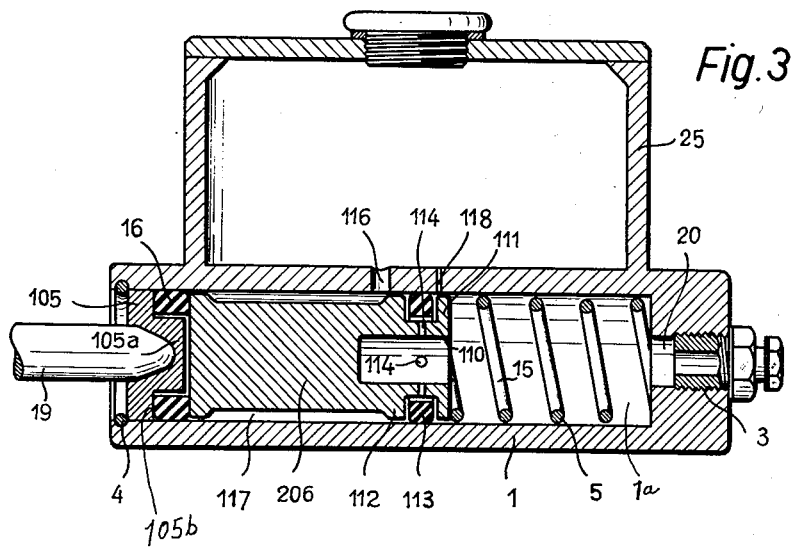
Fig. 3 is a longitudinal sectional view of a further modified form of a master cylinder constructed according to the present invention and Fig. 4 is an enlarged detail view in section of a modified form of the embodiment shown in Fig. 3.

Referring to Fig. 1, 1 denotes the master cylinder closed at one end by an axially bored plug 2 to which a pipe leading to the hydraulic brake system is connected at 3. A retaining ring 4 is placed in an annular groove formed in the wall of the cylinder at its opposite end, said ring acting as a rear stop for the master piston. The piston comprises a rear metallic thrust member 5 and an axially bored spacer member 6.

A resilient packing ring 7 is placed between the rear metallic thrust member 5 and spacer member 6, and another packing ring 8 is placed adjacent the opposite end of the said spacer member, and adjacent thereto has an axially bored disc 9.

The plug 2 is provided at its inner end with a tubular axial extension 2a having a diameter which is smaller than that of the cylinder bore and having a radially extending annular flange 12 at its free end, whereby an annular chamber 17 is formed between the wall of the cylinder bore and the outer periphery of the tubular extension 2a.

Numeral 10 denotes a flanged bushing member bearing at one end against the annular front sealing surface 12a of the extension 2a and provided at its other end with a radially extending annular flange 11.

The bore 10a of the member 10 communicates, respectively, at its opposite ends, with the bore 20 provided in the plug 2, and with the chamber 1a of the cylinder bore. The bore 10a further communicates with the annular groove 213 situated between the flanges 11 and 12 through a set of openings 14 radially bored in the wall of the tubular bushing member 10.

The outer diameter of each of the flanges 11 and 12 is substantially smaller than that of the cylinder bore whereby the hydraulic fluid contained in the cylinder is always free to flow around the outer edges of the flanges 11 and 12. 13 denotes a ring made of elastic material, with its outer periphery contacting the inner wall 1b of the cylinder, and fitted on the member 10 so as to be located in the groove 213 formed between the flanges 11 and 12. The inner diameter of the ring 13 is greater than the outer diameter of the member 10 and the axial thickness of the ring 13 is less than the axial length of the member 10.

The tubular bushing member 10 together with its flange 11 is urged against the radial face 12a of the plug 2 by a helical spring 15. The other end of the spring 15 bears against disc 9. The annular chamber 17 communicates with a fluid reservoir tank 25 situated above the cylinder 1 through an opening 16 radially bored in the cylinder wall.

The fluid reservoir 25 further communicates with the compression chamber 1a of the cylinder, through a compensation port 18, which is so located that the communication through it is established when the piston is in its fully retracted position.

The ring 13 and packing rings 7 and 8 of the master piston are of the type having under normal conditions, i. e., in the inoperative position of the system, only a part of their outer periphery in contact with the wall of the master cylinder bore.

In the embodiments shown, each of said rings has opposite, radially extending side walls, an inner cylindrical bore coaxial with that of the cylinder and an outer surface of arcuate cross section symmetrically arranged with respect to the radial middle plane of symmetry of each ring. Obviously, with such construction, the contact zone of these rings with the master cylinder wall increases with the increase in fluid pressure on their inner cylindrical bores.

The packing ring 7, is fitted on an axial cylindrical projection 5a of the thrust member 5, and of which its inner diameter is equal to or slightly less than that of the said projection. The axial thickness of the ring 7 is greater than the axial length of the projection 5a, so that a part of the inner periphery of the ring 7 overhangs said projection and is subjected to the pressure of the fluid contained in the master cylinder. 19 denotes a thrust rod operated by the brake actuating member, e. g. a pedal.

During the protractile stroke of the master piston 5, 7, 6, 8, 9, the parts working as a unit, the fluid flows under growing pressure through the bores 10a and 20 towards the hydraulic brake system. The fluid pressure is simultaneously transmitted through the space between the outer periphery of the flange 11 and the wall of the cylinder bore in the groove 213 and exerts an axial thrust on the ring 13 displacing the latter towards the flange 12 till the lateral wall 13a abuts the front face 12a of said flange, thereby interrupting communication between the fluid reservoir tank 25 and the compression chamber 1a. The fluid pressure is also transmitted through the ports 14 to the inner periphery of the ring 13 and causes the latter to be acted upon by a radial pressure, whereby the contact zone between its outer periphery and the cylinder wall is increased hence increasing the effectiveness of the ring 13 as a seal.

During the return, or retractile, stroke of the piston the pressure in the compression chamber drops quickly down to a value lower than that in the chamber 17 communicating with the reservoir tank 25. The result is that the ring 13 is withdrawn from the front surface 12a of the flange 12 and communication between the reservoir tank 25 and compression chamber 1a is re-established through the port 16, chamber 17, the space between the outer periphery of the flange 12 and cylinder wall, groove 213, further through ports 14 and bore 10a, and through the space between the cylinder wall 16 and the outer periphery of the flange 11.

The excess fluid in the master cylinder flows back into the reservoir 25 through the port 18 when the piston is returned to its initial position, thereby preventing any increase in pressure in the master cylinder and in the brake system, when the piston is fully retracted.

The sealing effect of the ring 7 located at the rear part of the master piston is enhanced during the protractile stroke of the latter on account of the fact that this ring is simultaneously subjected to a radial and axial pressure, whereby the contact surface between its outer periphery and cylinder wall increases.

In the embodiment shown in Fig. 2, the elastic floating ring 113 is mounted on the master piston, movable in cylinder 1, and the cylinder 1 is provided with flanges for attachment to the vehicle. The master piston is made of one cylindrical body 106 provided with two flanges 21 and 112 confining an annular chamber 117, formed between the outer periphery of the body 106 and the wall of the cylinder 1. The outer diameter of said flanges is slightly smaller than the inner diameter of the cylinder 1. An annular groove 230 is formed in the head of the piston confined at the rear by the front face 112a of the flange 112, at the front by the rear face 111a of the flange 111 provided on an axial tubular extension 110 of the body 106 formed with radial ports 114. The elastic ring 113 is seated in said groove 230 and its axial thickness is slightly smaller than the spacing between the opposed faces 111a and 112a while the inner diameter of the said ring is slightly greater than the outer diameter of the tubular extension 110. The elastic ring 113 consequently floats axially on the master piston, that is, it may move longitudinally between the walls 111a and 112a.

The fluid reservoir tank 25 incorporates the whole rear part of the cylinder 1; the actuating rod 19 of the piston reaches within said reservoir through a bore provided in its rear wall 25a in which a packing ring 22 is arranged. This control rod 19 may be operated directly by the brake pedal or by a device controlled by compressed air. The master piston is held in its retracted position by the spring 15 bearing at one end against the front surface 111b of the flange 111 and at its opposite end against the bottom 1c of the cylinder 1. The reservoir constantly communicates with the annular chamber 117 through the annular clearance between the wall of the cylinder 1 and the outer periphery of the flange 21 of the body 106 and the chamber 117 communicates with the groove 230 in which the elastic ring 113 is located through the annular clearance between the outer periphery of the flange 112 and the cylinder wall, while the said groove is connected with the compression chamber 1a of the cylinder through the radial ports 114. The ring 113, is moved during the protractile stroke of the master piston against the rear wall 112a of the groove 230 by the friction exerted by the wall of the master cylinder on the outer periphery of the ring; moreover, the pressure exerted by the fluid on the inner bore of the ring 113 enlarges the contact area between its outer periphery and the inner wall cylinder 1. Consequently, the communication between the reservoir 25 and the compression chamber of the cylinder 1 is interrupted during the protractile stroke of the master piston.

During the retractile or return stroke of the master piston under the action of spring 15, the floating ring 113 is brought into contact with the face 111a of the flange 111 by effect of the friction exerted by the inner wall of the master cylinder on the outer periphery of the ring 113. The decompression involved in the compression chamber 1a of the cylinder 1 causes the contact area between the outer periphery of the ring 113 and the inner wall of the cylinder to decrease. The fluid flows from the reservoir tank 25 into the compression chamber 1a of the cylinder through the port 118, into space 230 on the piston 106, around packing ring 113, through ports 114. Fluid also flows around the packing ring in the space 230 to the space between the piston 106 and the cylinder wall; a ready filling of the cylinder is thereby insured. Any excess of fluid in the master cylinder is conveyed back to the reservoir 25, when the master piston is fully retracted, through the port 118 in the wall of the cylinder 1.

Fig. 3 illustrates a further embodiment, in which the fluid reservoir tank does not incorporate the rear part of the cylinder, communication between the annular chamber 117 of the piston body 206 and the fluid reservoir tank 25 being established through a port 116 in the cylinder wall.

The part of the piston body 206 facing the compression chamber 1a is fully similar to that described with reference to Fig. 2, the elastic packing ring 113 fitted in said part permitting communication between the annular chamber 117 in the piston body 206 and the compression chamber 1a placed before the piston on the retractile stroke of the master piston, and intercepting said communication during the protractile stroke in the same manner as described above. The rear part of piston body 206 rests against a packing ring 16 having its outer periphery in partial contact with the inner wall of cylinder 1. The ring 16 rests against a thrust member 105 on which the control rod 19 of the brake acts. The thrust member 105 is formed in its forward part with a cylindrical projection 105a equalling or slightly smaller in diameter than the inner bore of the packing ring 16. The length of the projection 105a is under rest conditions of the system smaller than the axial thickness of the packing 16, so that part of the packing overhangs the projection. Sealing is insured by the contact between the outer periphery of ring 16 and inner wall of the cylinder 1 and the contact between the rear side face of the ring 16 and the annular front surface 105b of thrust member 105. The thrust member 105 bears, under rest conditions of the system, against the retaining ring 4 by action of the spring 15.

Figure 4:
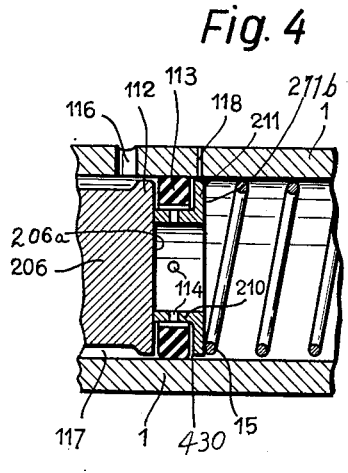

Fig. 4 shows a modification of Fig. 3, in which the annular groove 430 forming the seat for the axially floating elastic ring 113 is formed between the front surface 206a and the cylindrical tubular body 210 provided with a flange 211, the said body 210 being urged against said face 206a by the spring 15 bearing on the annular front surface 211b of the flange 211.

The embodiments shown in Figs. 2 and 4 afford over the embodiment illustrated in Fig. 1, the further advantage that the axial displacement of the floating ring with respect to the annular groove in which it is located is effected by the action of both the fluid pressure on the side walls of ring 113 and friction exerted by the inner wall of the cylinder on the outer periphery of the ring. Moreover, no grinding of the inner wall of the cylinder and of the outer periphery of the piston body is necessary, the outer diameter of said piston being slightly smaller than the inner diameter of the master cylinder.

What I claim is:

1. A master cylinder for hydraulic brake systems comprising in combination a bore in said cylinder defining a pressure chamber; fluid supply means in communication with said chamber and a valve for controlling communication between said fluid supply means and chamber, said valve comprising a resilient member in sealing engagement with the bore of said cylinder, said valve member having a central bore, said valve member being positioned in the path of communication between said fluid supply means and pressure chamber; means in said cylinder comprising a valve support having spaced walls and a base defining an annular groove, said valve member being seated in said groove with its side walls and bore, respectively, spaced from the side walls and base defining said groove, said valve member being movable longitudinally in said groove; ports in said base establishing communication between the pressure chamber and said groove, said groove likewise lying in the path of fluid flowing to and from the fluid supply means and pressure chamber; a piston in said chamber movable in a protractile and retractile stroke, and means to return said piston on its retractile stroke, the protractile stroke of the piston creating pressure in said chamber and groove to force said valve member into sealing engagement with an adjacent wall of said groove to shut off communication between the chamber and fluid supply means, the pressure likewise acting in the bore of said resilient valve member to press the periphery thereof sealingly against the cylinder bore; the retractile stroke of the piston causing a decrease of pressure in said chamber and causing the resilient member to break its seal and move to the opposite wall of said groove, reestablishing communication between the fluid supply means and chamber.

2. A device according to claim 1 in which the valve and valve support is positioned in the cylinder opposite the piston.

3. A device according to claim 1 in which the piston comprises the means forming the valve support.

4. A device according to claim 1 in which an end of the piston forms a stop member, a flanged bushing is seated against said stop member and said resilient valve member is supported on said flanged bushing between said stop member and the flange of the bushing.

5. A device according to claim 1, in which said valve support includes a portion of said piston; a flanged ring is seated against the said portion of the piston, and said valve member is supported on said ring between said piston and the flange of said ring.

6. A combination according to claim 1, in which the piston comprises a plurality of parts including a thrust member 5, a pair of sealing rings 7—8, a spacer member 6 separating said rings, the thrust member having a shoulder 5a, one of said sealing rings 7 being seated on said shoulder between the thrust member and spacer, the axial extension of the shoulder being shorter than the axial thickness of the ring, whereby the latter is compressed between said thrust member and spacer on the protractile stroke of the piston to form a seal, said piston returning means lying between said piston and said valve.

References Cited in the file of this patent

UNITED STATES PATENTS

| | | |
|---|---|---|
| 2,114,992 | Bowen | Apr. 26, 1938 |
| 2,232,350 | Swift | Feb. 18, 1941 |
| 2,272,359 | Swift | Feb. 10, 1942 |
| 2,276,009 | Baldwin | Mar. 10, 1942 |
| 2,326,116 | Baldwin | Aug. 10, 1943 |
| 2,444,181 | Baldwin | June 29, 1948 |
| 2,615,304 | Groves | Oct. 28, 1952 |